(12) United States Patent
Hawes

(10) Patent No.: US 6,701,279 B1
(45) Date of Patent: *Mar. 2, 2004

(54) FORMATION OF UNIFORM BLOCKS OF FOODSTUFF

(75) Inventor: Richard John Hawes, Norwich (GB)

(73) Assignee: AEW- Engineering Co Ltd, Norwich (GB)

( * ) Notice: Subject to any disclaimer, the term of this patent is extended or adjusted under 35 U.S.C. 154(b) by 0 days.

This patent is subject to a terminal disclaimer.

(21) Appl. No.: 09/980,930

(22) PCT Filed: May 22, 2000

(86) PCT No.: PCT/GB00/01965
§ 371 (c)(1),
(2), (4) Date: Feb. 28, 2002

(87) PCT Pub. No.: WO00/74492
PCT Pub. Date: Dec. 14, 2000

(30) Foreign Application Priority Data

Jun. 9, 1999 (GB) ............................................. 9913299

(51) Int. Cl.[7] .............................. G01B 15/00; G01B 7/00
(52) U.S. Cl. ....................................................... 702/155
(58) Field of Search ................................. 702/155, 156, 702/127, 158

(56) References Cited

U.S. PATENT DOCUMENTS

| 4,213,360 A | 7/1980 | Hartmann |
| 5,163,865 A | 11/1992 | Smith |
| 5,243,886 A | * 9/1993 | Rudy et al. ..................... 83/19 |
| 5,391,109 A | * 2/1995 | Wadell ........................ 452/155 |
| 5,819,615 A | 10/1998 | Dale |
| 5,862,728 A | * 1/1999 | Giamello ........................ 83/13 |
| 6,120,369 A | * 9/2000 | Eide ............................ 452/149 |
| 6,164,174 A | * 12/2000 | Sigurdsson et al. ............ 83/13 |
| 6,407,818 B1 | * 6/2002 | Whitehouse ................ 356/627 |

FOREIGN PATENT DOCUMENTS

| EP | 0 429 711 A1 | 6/1991 |
| GB | 2 280 869 A | 2/1995 |
| WO | WO 98/35797 A1 | 8/1998 |

* cited by examiner

Primary Examiner—John Barlow
Assistant Examiner—Demetrius Pretlow
(74) Attorney, Agent, or Firm—Barnes & Thornburg

(57) ABSTRACT

Method of reducing waste in a process involving the cutting up of blocks of frozen foodstuff, especially blocks of plate frozen fish fillets are described in which at least the final cutting step is performed using a guillotine rather than a bandsaw. Additionally, methods and apparatus are described for adjusting the length of the frozen foodstuff which is advanced before the next cut is to be performed, so as to produce final cut pieces of substantially uniform weight. The methods allow for variations in density and variations in cross section to be accommodated.

9 Claims, 2 Drawing Sheets

FORMATION OF UNIFORM BLOCKS OF FOODSTUFF

FIELD OF INVENTION

Figure 1:
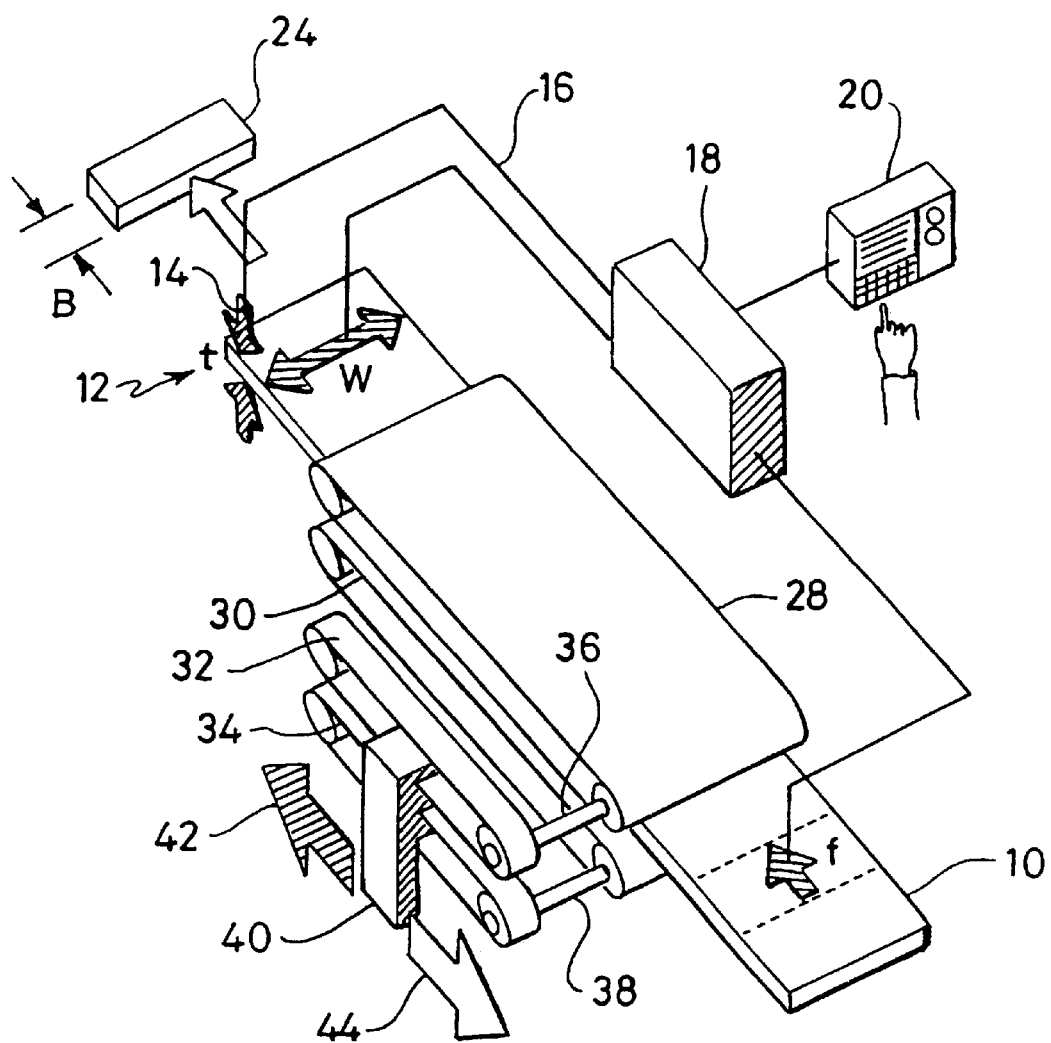

This invention concerns the cutting up of blocks of foodstuff typically but exclusively blocks of frozen fish fillets, as produced by plate freezers on board trawlers shortly after the fish have been caught and filleted.

BACKGROUND TO THE INVENTION

It is known that frozen blocks of filleted fish as aforesaid are often not truly rectalinear and can have a tendency to bow so that they are thicker midway of their length dimension than at their ends.

The blocks have to be cut into small rectangular or other shaped pieces during processing in land based food processing facilities typically in order to produce uniform sized portions of frozen fish for sale through retail outlets to the end customer. If the thickness of the block varies, then a simple cutting process (which assumes uniformity of the blocks) will result in non-uniform final portions, which is unacceptable.

Cutting processes are described in UK Patent Specification 2280869. Typically the blocks are cut a number of times using bandsaws or the like, into planks, until a final desired thickness of plank is achieved, and the planks are then ice-welded end to end before cutting the now continuous length of product into uniform lengths for shaping under pressure (whilst still frozen) in suitable tooling, to produce a fillet shaped final portion for packaging and supply to the end user.

It is an object of the invention to provide a method and apparatus for cutting the continuous length of frozen foodstuff, so as to ensure a greater degree of uniformity of final portion size and reduce waste.

SUMMARY OF THE INVENTION

According to one aspect of the present invention in a process of reducing blocks of frozen foodstuff into small consumer portions, and for the purpose of reducing the amount of waste foodstuff produced by the cutting process required to reduce the blocks of frozen foodstuff to smaller final-sized rectangular portions for shaping and wherein the sawn planks of frozen foodstuff are ice welded end to end to form a continuous length of foodstuff from which the final-sized rectangular portions are to be cut prior to being pressure shaped in suitable tooling whilst still frozen, at least the final cutting step for reducing the continuous length of foodstuff into the final-sized rectangular portions is performed using a guillotine rather than a band saw, so as to reduce the waste which is always produced whenever product is sawn.

According to another aspect of the invention measurements are made on the ice-welded planks prior to the final cutting step, to determine at least one cross section dimension of the continuous length of welded planks, and the position of each final cut relative to the last is determined after taking into account the size of the cross section of the plank of material ahead of the cut that is to be made. This aspect of the invention allows for a more accurate cutting up of the ice welded planks to produce uniform weight consumer portions, which if after final weighing are found to be over or under weight, may have to be discarded and certainly cannot be supplied for retail sales where the portion weights have to be within strict limits.

In a method of cutting up a long length of frozen foodstuff whose density is substantially constant but whose cross section may vary in size, into lengths which are of substantially uniform weight, at least one cross sectional dimension of the frozen foodstuff is measured prior to the final cutting step, the length of the foodstuff required to be cut from the continuous length thereof to produce a rectangular portion of the desired weight is computed and the length of foodstuff is advanced relative to the cutting device by a distance equal to the computed length and the final cut made so as to remove that length of foodstuff from the end of the remaining continuous length thereof.

By combining the two aspects of the invention, the waste can be reduced even further and therefore in accordance with another aspect of the invention, in a method of cutting up a long length of frozen foodstuff whose density is substantially constant but whose cross section may vary in size, into lengths which are of substantially uniform weight, wherein at least one cross sectional dimension of the frozen foodstuff is measured prior to the final cutting step and the length of the foodstuff required to be cut from the continuous length thereof to produce a rectangular portion of the desired weight is computed, and the length of foodstuff is advanced relative to the cutting device by a distance equal to the computed length so that when made, the final cut will remove that length of foodstuff from the end of the remaining continuous length thereof, at least the said final cut is performed by a guillotine.

The cross section dimension to be measured may be the thickness (ie height) of the foodstuff plank where the width of the plank can be guaranteed to remain constant.

Likewise the cross section dimension to be measured may be the width of the plank where the thickness (ie height) can be guaranteed to remain constant.

Where no such guarantees exist, as is often the case, then both width and thickness (height) are measured in order to enable the size of the cross section of the plank to be accurately computed and for the length dimension for the portion to be cut, then to be computed.

Where the density of the product may vary, a weighing step may be included to determine either before or after cutting the final-sized portions, the weight, and therefore from a knowledge of the volume of the material that has been weighed, the density of the material, for subsequent use in the computation of the length of the portions that are to be cut from the length to give a desired weight.

Since it is difficult to weigh a continuous length of product, the weighing step is most conveniently situated after the final cutting step so that it is a final-sized rectangular portion which is weighed.

Where density is unlikely to vary within any one large block of frozen foodstuff or from one large block to another particularly when produced using the same plate freezer on the same trawler, it is sufficient to assume a density value for the product and cut at least one final-sized rectangular portion in accordance with the second aspect of the invention if not also the first, and to check weigh the resulting portion and compute therefrom the actual density of the foodstuff and adjust the assumed density value accordingly for subsequent use.

By cutting a plurality of final sized rectangular portions and weighing them together and determining the mean density, by dividing the weight by the total volume of all the portions, a more useful density value may be obtained given that the process may introduce slight variations in volume of individual portions.

The invention also lies in apparatus for cutting up a continuous length of frozen foodstuff as aforesaid in accordance with the various aspects of the invention.

The invention also lies in apparatus for cutting up a continuous length of frozen foodstuff as aforesaid in accordance with the various aspects of the invention in combination with portion weighing means for determining the weight of cut portions, computing means for determining the density of the material from which the portions have been cut, and memory means for storing the density value to be used in the computation of length by which the foodstuff plank is to be advanced before the next cut is to be made so as to produce a portion of a particular weight.

The invention also lies in the combination of a frozen-foodstuff cutting machine for producing uniform weight rectangular portions of frozen-foodstuff with computing means and with transducer means adapted to determine specific parameters such as height and width dimensions of continuous plank material which is to be cut to length, and for determining the weight of cut pieces, and a computer programme which when loaded into the computer and operating same, will cause the cutting machine to cut the continuous length of material whose density is substantially constant but whose cross section may vary in size, into lengths which are of substantially uniform weight, by commuting from the height and width dimensions the cross section of the plank material prior to the final cutting step, computing the length of the foodstuff material required to be cut from the continuous length thereof to produce a rectangular portion of the desired weight using a stored (either previously measured or computed or assumed) density value for the material, generating a control signal for a plank advancing drive means to advance the foodstuff material relative to the cutting device by a distance equal to the computed length, and generating a cut command signal to instigate the final cut so as to remove that length of foodstuff from the end of the remaining continuous length thereof.

Where the density is known and constant, a single value for the density of the material can be stored in the computer memory for use I computing the lengths to be cut and the weighing means is not generally required to be used except for the initial setting up of the machine and the entry of control parameters into the computer for use in the various computations.

Where however the density is not constant, the weighing means may be adapted to weigh at least some if not each of the cut portions, and the programme is adapted to cause the computer to compute the density of the weighed cut portion, and if necessary to adjust the stored density value for use in the subsequent computation of a length that is to be cut from the plank material to achieve a given portion weight.

The invention also lies in a computer programme for use in a computer to perform the steps as aforesaid.

The invention also lies in a computer programme as when stored on a data carrier for entry into a computer when required.

The invention also lies in cut portions of frozen foodstuff sized in accordance with the invention.

The invention also lies in a food processing facility operating so as to reduce waste and incorporating cutting machines for reducing large blocks of frozen foodstuff to substantially uniform cross section planks which can be ice welded end to end to form a continuous length of the material prior to being cut into final sized rectangular portions of substantially constant weight in which at least the final cutting step is performed by a guillotine, to reduce waste.

The invention also lies in a food processing facility operated so as to reduce waste and incorporating cutting machines for reducing large blocks of frozen foodstuff to substantially uniform cross section planks which are ice welded end to end to form a continuous length of the material prior to being cut into final sized rectangular portions of substantially constant weight, in which at least the final cutting step is performed by a guillotine to reduce waste, and the cross section of the continuous length of material is measured prior to the final cut and the distance through which the continuous length of material is advanced beyond the guillotine before the final cut is made is computed to take into account at least the area of cross section of the material that is to be cut so as to produce portions of similar volume so that if the material density is substantially constant the cut portions will be of similar weight, thereby further to reduce waste.

Figure 2:
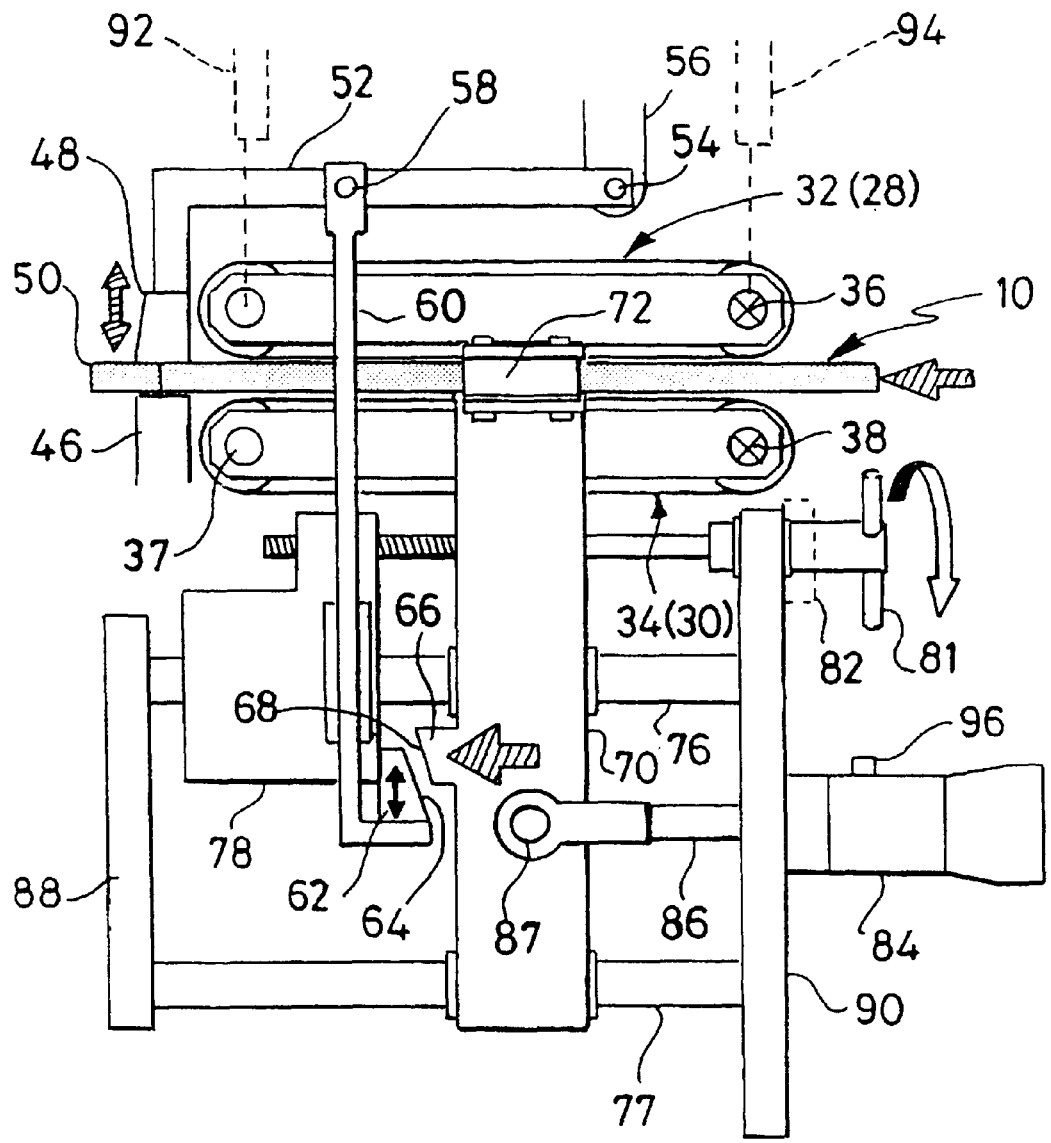

The invention will now be described by way of example with reference to the accompanying drawings in which:

FIG. 1 is a schematic diagram of a system incorporating the invention, to achieve desired final block size; and FIG. 2 is a side elevation of a mechanism for incorporation into the system of FIG. 1 for adjusting portion length in response to a thickness measurement.

In FIG. 1 the thickness (t) of long lengths of frozen foodstuff (typically in the form of a continuous length thereof) 10 is monitored at 12 by a floating gauge 14 and signals indicating the instantaneous thickness of the material are supplied along signal paths 16 to a computer based control system 18 which includes a display and keyboard module 20.

The width of the plank material (w) is also monitored by a second gauge at 12 and signals indicating the instantaneous plank width are fed via signal path 22 also to the control system 18.

Downstream of the measuring station 12 is located a guillotine (not shown in FIG. 1) which is operated to sever a protruding portion of the plank from the remainder to form a final portion such as shown at 24. The amount (f) by which the plank material is indexed in the direction of the arrow 26, between each operation of the guillotine, is determined by a feed mechanism, the forward stroke of which (and therefore the amount of (f)), is determined from a computation involving the values of w and t being supplied to the computer 18 and information such as desired final portion size, which is keyed into the computer at the outset via keyboard/display module 20, by the operator.

The plank material 10 is sandwiched between two feed conveyors 28, 30 which are driven by two endless belts 32, 34 respectively via shafts 36, 38. The belts 32, 34 are themselves advanced by a clamping block 40 which grips the two belts by means of sprague clutches (not shown) so that movement of the block 40 in the direction of arrow 42 is transmitted to the belt, but its reverse direction 4 is not so transmitted. The movement of the block in the direction of arrow 42 thus determines the feed (f) and the dimension (B) of the next final portion 24.

Movement of the clamp 40 and operation of the guillotine are under the control of the computer 18, and the latter is only operated after the former has moved by the desired amount.

FIG. 2 shows a mechanism for controlling the distance (f) in relation to the thickness (t).

The gauge 14 of FIG. 1 is made up of a fixed anvil 46 and a floating probe 48 the weight of which is sufficient to maintain it in contact with the upper surface 50 of the plank 10 downstream of the indexing conveyors 28, 30. Spring assistance (not shown) to keep the probe 48 in contact, may be employed.

The probe 48 is carried at the free end of a cantilevered arm 52 pivoted at 54 to a fixed support 56. As the thickness t varies, so the probe moves the arm 52 up or down.

Pivotally joined at 58 and suspended from the arm 52 is a rod 60 at the lower end of which is a block 62 having an inclined face which serves as an end stop for a similar block 66 having a complementary inclined face 68. The block 66 forms an integral part of a sliding assembly 70, the upper end of which comprises a clamping block generally designated 72 which (as described previously) is attachable by sprague clutches (not shown) to the two drive belts 32, 34, so that movement of the sliding assembly 70 in the direction of arrow 74 will advance the plank material 10 in the direction of arrow 76.

The assembly 70 is slidable on guides 76, 77 and the rod 60 is slidable in a block and slide 78.

The precise position of the latter is determined by rotation of a lead screw drive 80 which is either adjustable or by handle 81, when automated and incorporated into a system as shown in FIG. 1, is driven by a servo motor 82.

The movement of the assembly 70 in the direction of the arrow 74, and backwards in the opposite sense, is under the control of a double acting cylinder (air or hydraulic) 84 connected thereto via a rod 86, pivotally joined to the assembly 70 at 87.

Machine frame members 88, 90 provide fixings for guides 76, 77; lead screw 80; cylinder 84; and the shafts 37, 38 associated with the lower belt drive 34 and conveyor 30.

Two pairs of gas struts shown in dotted outline in FIG. 2 and generally designated 92, 94 force the upper shafts 35, 36 of the upper conveyor 28 and belt drive 32, in a downward sense to grip the plank material 10 between the conveyors 28, 30.

When forming part of the system shown in FIG. 1 the computer control system 18 controls the operation of the servo motor 82 so as to shift the stop block 62 to where it should be if the plank thickness t is a calculated value. Shifting of the probe 50 up or down as the actual thickness (t) varies, adjusts the actual advance of the assembly 70 and therefore advance of the plank 10. A bleed or pressure relief valve generally designated 96 prevents overpressure occurring at the end of each forward stroke of the cylinder 84.

The control system is therefore simplified in only having to provide alternating pulses of power to the cylinder 84 and if no account is to be taken of width w, the floating probe 48 will control the plank advance following each powering of the cylinder 84.

Where width is to be taken into account the width signals enable the computer to adjust the motor 82 to take account of any oversize or undersize width of plank material.

What is claimed is:

1. A method of determining the volume of a length of bulk product having a varying cross-section, including the steps of linearly moving the product through an inspection plane which extends generally perpendicular to the linear movement of the product by means of a motor-driven conveyor, and computing the length of the product by reference to its linear speed past a detector, comprising the steps of
   (1) moving at least one distance measuring transducer in the inspection plane along an actuate path which extends only partly around the product cross-section,
   (2) computing the distance from the transducer to each of a succession of points around the free surface of the product in the inspection plane,
   (3) computing therefrom and from stored data about the shape of the surface of said conveyor in, or just upstream or downstream of the inspection plane, the area of the cross-section defied by said points to provide a complete set of data by which to compute the cross-sectional shape and/or area,
   (4) determining the increments of volume of product attributable to each transducer scan by reference to the distance moved by the product before the next scan, and
   (5) summing the increments of volume over the whole of the length of the product as it progresses through the inspection plane.

2. A method as set forth in claim 1, when modified to determine the weight of bulk product by the steps of providing a mean density value and multiplying the computed volume by the mean density value.

3. A method as set forth in claim 2, when applied to a log of fresh meat which is to be fed into a cutting machine, in which the position and/or angle of each cut determines a parameter of size, weight, volume and/or shape of the severed portions, and further comprising the step of computing successive positions at which the log is to be cut from data derived from the transducer, so as to enable the cutting machine to cut portions of constant parameter, or to produce the optimum number of portions and end pieces from the log of meat.

4. A method as set forth in claim 1 when applied to a log of floppy product, wherein the conveyor extends through the inspection plane and the method involves:
   (1) determining the shape of the underside surface of the floppy product which is to be conveyed therethrough by the conveyor by scanning the surface of the conveyor by the transducer at a time when there is no product in the inspection plane, and
   (2) storing data relating to the shape and position of the upper surface of the conveyor where it extends through the inspection plane to be used subsequently as data defining the underside of floppy product when the latter is located thereon in the inspection plane.

5. A bulk product measuring system for carrying out a method as set forth in claim 1, comprising
   (1) conveyor means for linearly moving the product,
   (2) at least one distance measuring transducer moveable transversely to the conveyor,
   (3) means for moving the transducer along an actuate path which extends only partly around the product cross-section,
   (4) data storage means for storing data about the shape of the surface of the conveyor means, and
   (5) a computer for computing the cross-section of the product using data obtained from the transducer and from said data storage means.

6. A system as set forth in claim 5 comprising
   (1) an array of three transducers arranged equidistantly around said actuate path, and
   (2) the means for moving the array is adapted to rotate the array through 60° which is sufficient to inspect the entire upper surface of the product, thereby enabling inspection at a higher sampling rate, and therefore at a greater accuracy.

7. A system as set forth in claim 5 comprising
(1) an array of three transducers arranged equidistantly around said actuate path, and
(2) the means for moving the array is adapted to rotate the array through 60° which is sufficient to inspect the entire upper surface of the product, thereby enabling inspection at a greater linear product speed without loss of accuracy.

8. A system as set forth in claim 5 in which the at least one distance measuring transducer comprises a laser displacement transducer.

9. A system as set forth in claim 6 in which the at least one distance measuring transducer comprises a laser displacement transducer.

* * * * *